Sept. 5, 1967    H. J. CORNWALL ET AL    3,339,685
TRANSMISSION
Filed Sept. 28, 1964    5 Sheets-Sheet 1
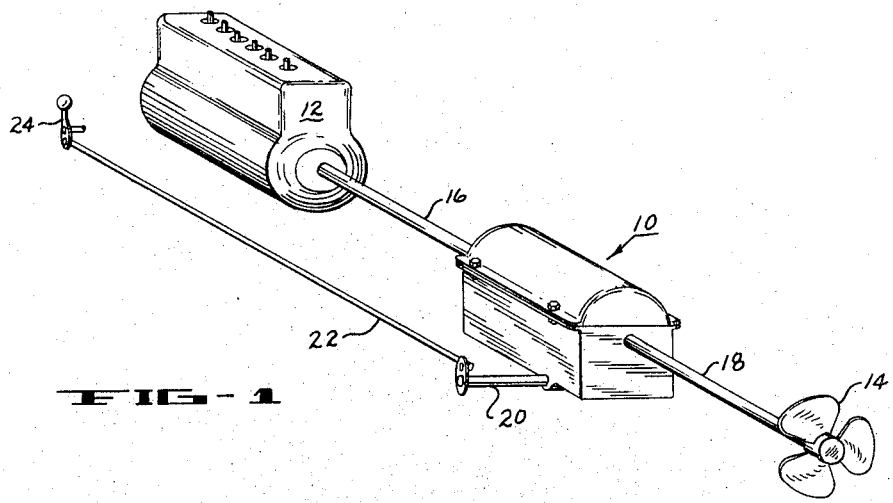
FIG-1
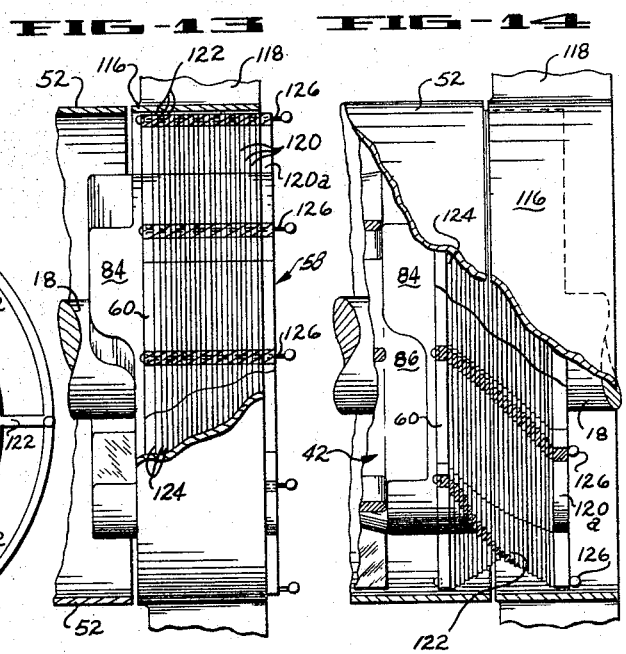
FIG-13  FIG-14
FIG-15
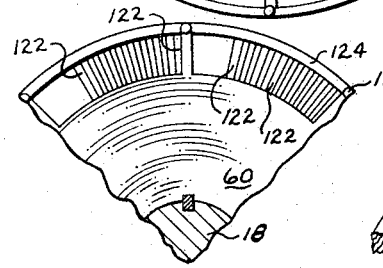
FIG-17
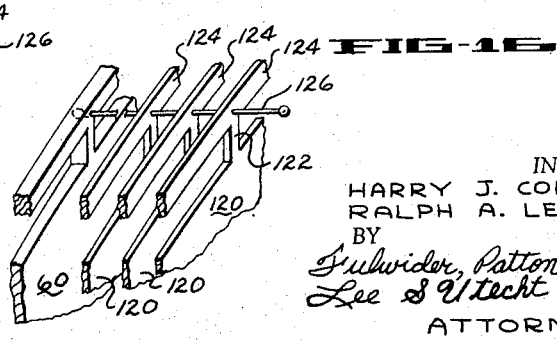
FIG-16
INVENTORS
HARRY J. CORNWALL
RALPH A. LE GAULT
BY
Fulwider, Patton, Rieber,
Lee & Utecht
ATTORNEYS Sept. 5, 1967 H. J. CORNWALL ET AL 3,339,685
TRANSMISSION
Filed Sept. 28, 1964 5 Sheets-Sheet 2
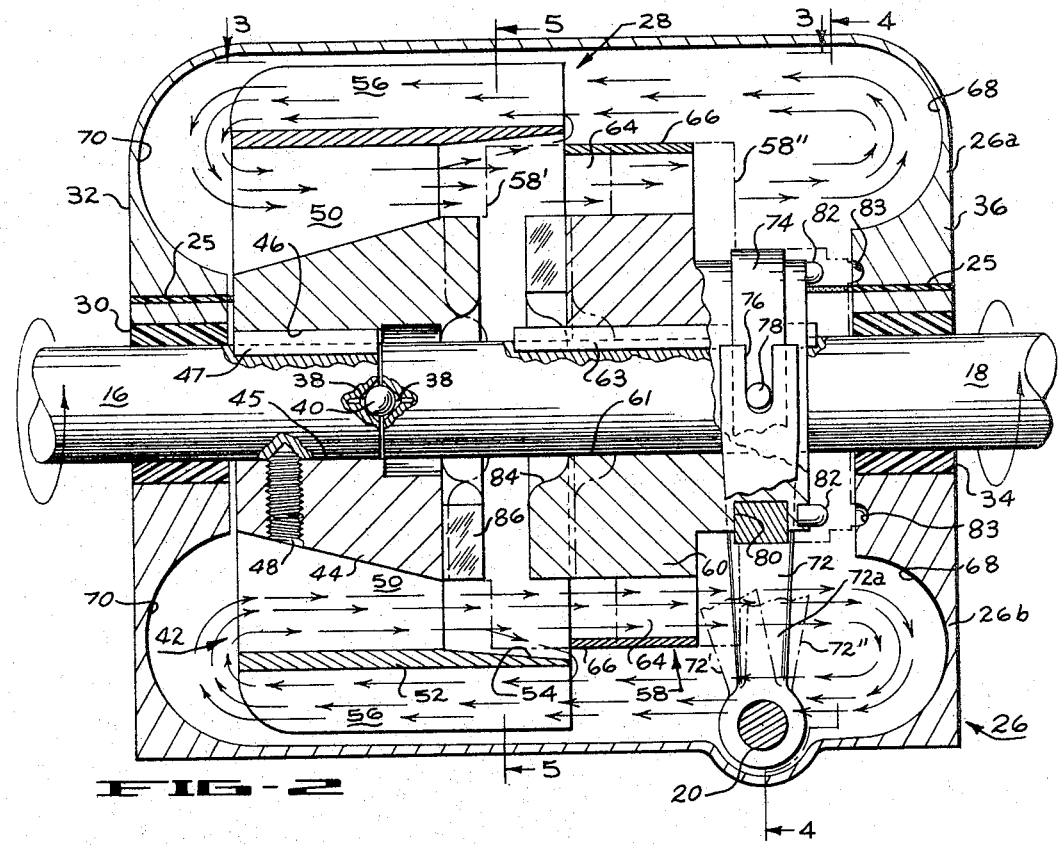
INVENTORS
HARRY J. CORNWALL
RALPH A. LE GAULT
BY Fulwider, Patton, Rieber,
Lee & Utecht
ATTORNEYS INVENTORS
HARRY J. CORNWALL
RALPH A. LE GAULT
BY
*Fulwider, Patton, Rieber*
*Lee S Utecht*
ATTORNEYS

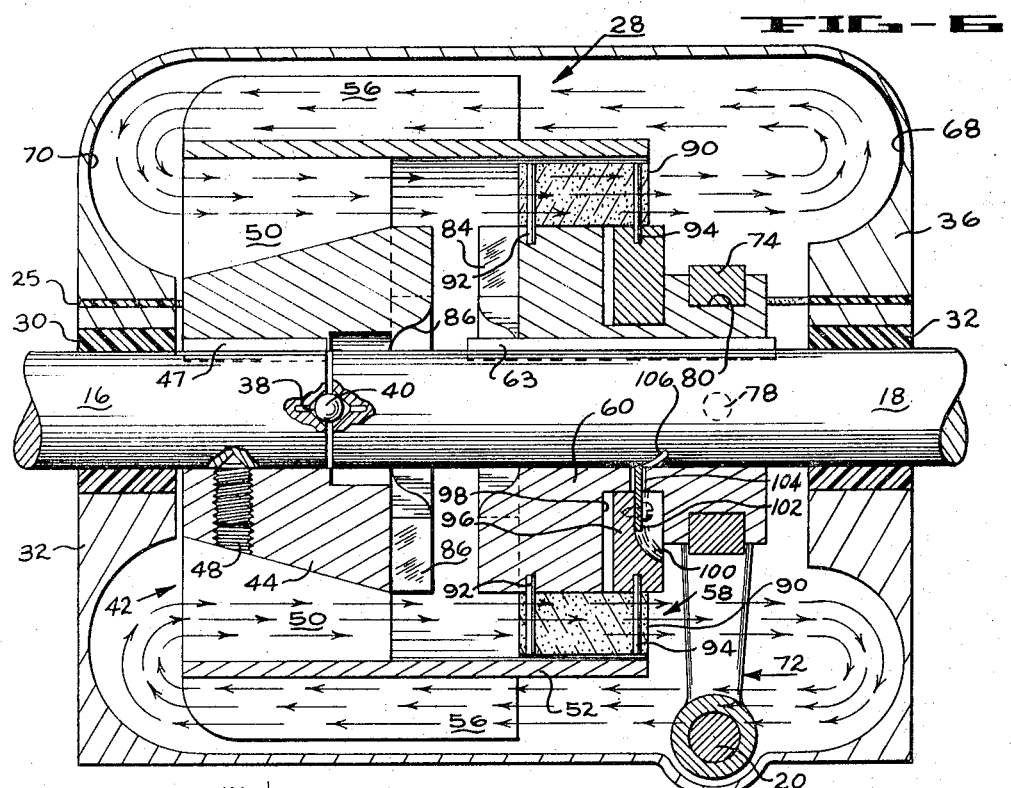
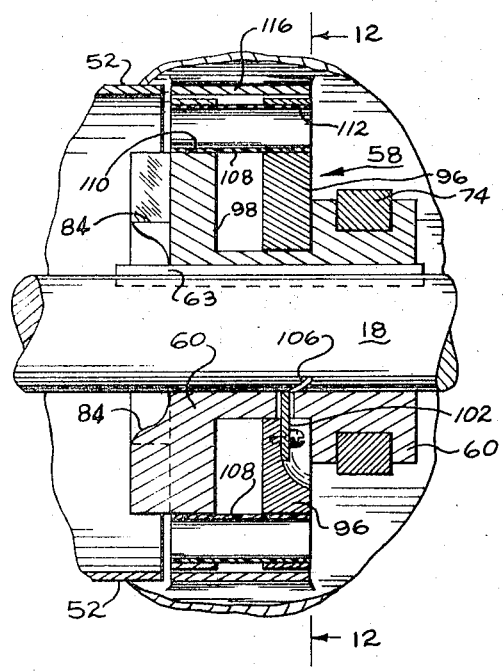
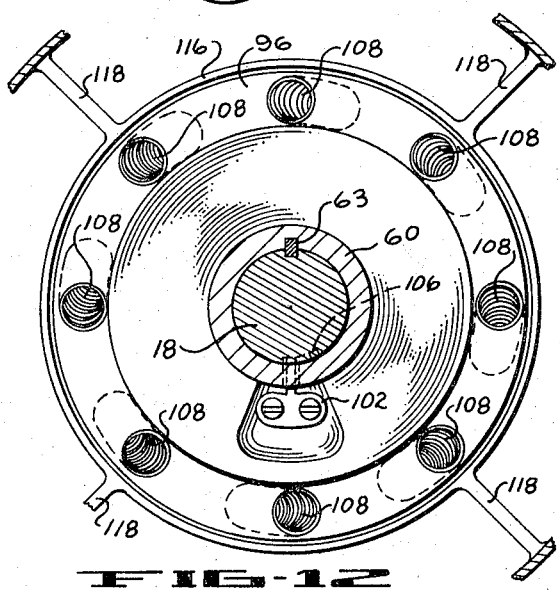

Sept. 5, 1967 H. J. CORNWALL ETAL 3,339,685
TRANSMISSION
Filed Sept. 28, 1964 5 Sheets-Sheet 5
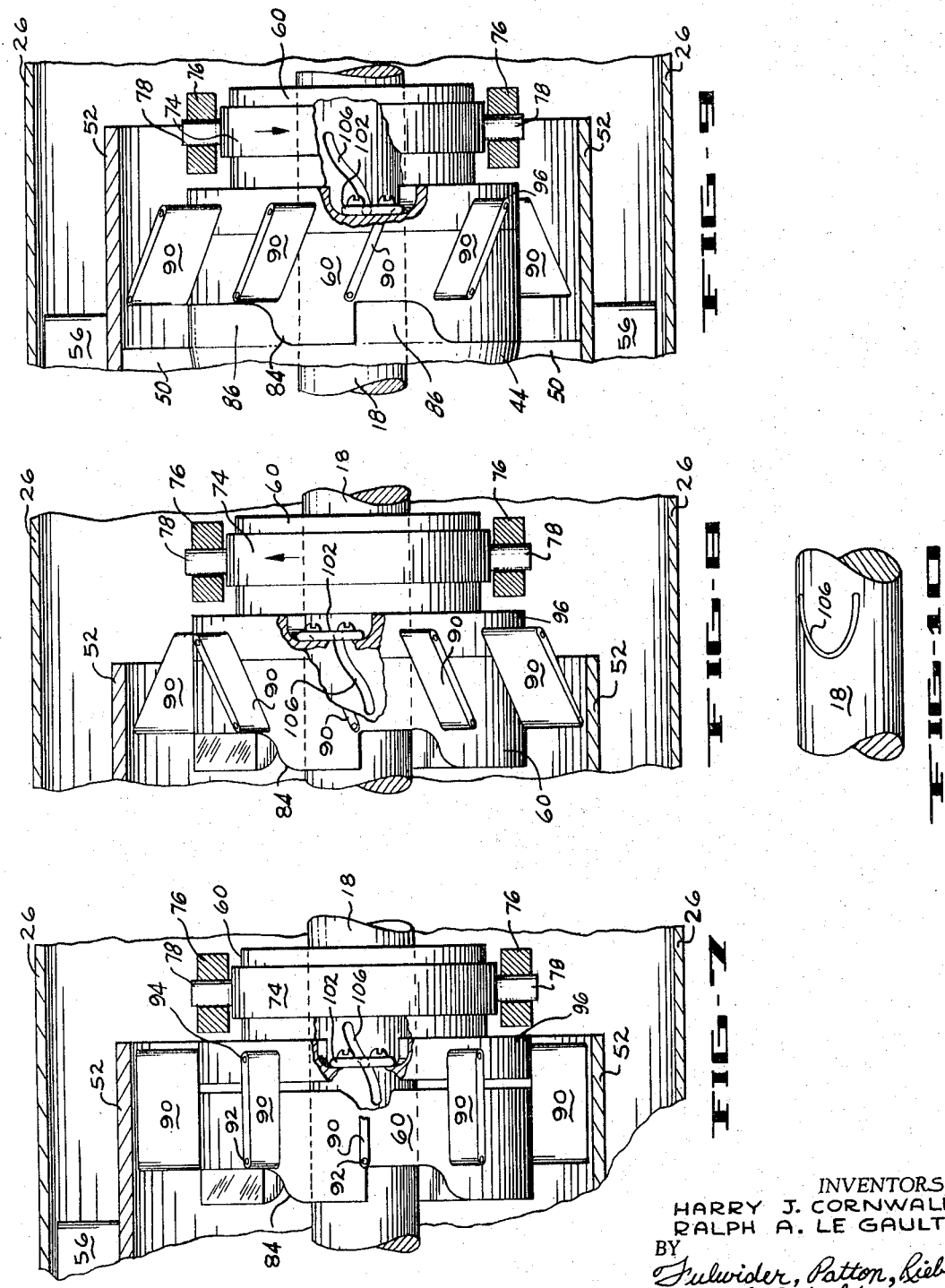
INVENTORS
HARRY J. CORNWALL
RALPH A. LE GAULT
BY
*Fulwider, Patton, Rieber*
*Lee S Utecht*
ATTORNEYS 3,339,685
TRANSMISSION
Harry J. Cornwall, Long Beach, and Ralph A. Le Gault, Lakewood, Calif., assignors to Con-Serv Inc., Long Beach, Calif., a corporation of California
Filed Sept. 28, 1964, Ser. No. 399,793
19 Claims. (Cl. 192—3.22)

ABSTRACT OF THE DISCLOSURE

A circulating fluid, turbine-type transmission in which fluid pumped in an axial flow under pressure by a fluid pump means reacts against the vanes of a fluid driven means to transfer torque. A direct drive mode is provided by means for positively locking together the pump and driven assembly when they are moved immediately adjacent each other, such locking being cushioned by the pressurized fluid. For the purpose of varying the transferred torque in the non-locked condition, the distance between the pump means and driven assembly is variable simultaneously with the pitch of the vanes on the driven assembly. The variable pitch of the vanes also provides a means for reversing the transmission.

---

The present invention relates to improvements in torque transferring apparatus and, more specifically, to a novel fluid-mechanical transmission particularly adaptable to use in high power inboard motor boats.

As the sport of water skiing has increased in popularity, so has the desire for more streamlined, lightweight, powerful, high speed, yet inexpensive motor boats. The same desire has, of course, been present for years in the sport of speed boat racing where it has been directed primarily to inboard motor racing boats. Unfortunately, the desire for powerful, high speed, inboard motor boats is somewhat incompatible with the desire for lightweight, inexpensive boats. High power inboard motors are relatively large, bulky and heavy. Moreover, the more powerful motors are not designed to operate at the low speeds required for docking, in-harbor travel, and water skier pick up, and can do so only with great strain and wear on the motor.

The logical solution to the problem, of course, is to include some sort of transmission between the drive shaft of the motor and the propeller shaft of the boat. Unfortunately, presently existing motor boat transmissions are quite expensive. Also, they are large, heavy and bulky and require specially reinforced mountings. Thus, the addition of presently known transmissions is out of the financial reach of most and, if employed, makes for still heavier, less streamlined boats. Further, speed boat transmissions are generally of a fluid-turbine type and do not provide for a direct drive coupling between the motor drive shaft and propeller shaft. Although the more expensive fluid-turbine type transmissions have torque transfer efficiencies up to about 80%, a substantial amount of motor power is wasted in the transmission. Also, boat mileage with such transmissions is very poor—only about two to five miles per gallon of gasoline. For these reasons, many have foregone the luxury of a transmission and operate their inboard motor boats with a direct coupling between motor drive shaft and propeller, turning the motor repeatedly on and off when low speed travel is desired. Although the direct coupling arrangement allows for the use of substantially 100% of engine power and ups boat mileage to eight to ten miles per gallon of gasoline, it places a great strain on the motor during low speed travel materially shortening its useful life.

The search for a solution or solutions to the foregoing problems has been long and arduous. Many different designs have been considered and abandoned. For example, it was for a time considered that a fluid clutch having a friction lock between its drive and driven parts might be usefully employed. Unfortunately, such was not the case. Such clutch designs include a closed casing for housing a fixed amount of fluid. Either the casing (having a plurality of internal vanes) is connected directly to the associated motor drive shaft for rotation therewith or the drive shaft (supporting a plurality of blades) extends within the casing for rotation within the fluid. In either instance, fluid within the casing is caused to rotate and swirl within the casing much as the mixture in a kitchen mixing bowl when whipped with an egg beater. A driven shaft carrying a plurality of vanes also extends within the casing. The vanes are movable along the driven shaft toward and away from the drive blades and when immediately adjacent form a friction lock between the drive and driven shafts. As the fluid swirls within the casing, molecular friction of the fluid upon the driven vanes causes the driven shaft to rotate in the same direction as the drive shaft.

Theoretically, such fluid clutch designs promise a solution to the foregoing problems since they are relatively simple and inexpensive. In practice, however, they have proved to be a total failure. The rotating housing design places too great a transverse strain on the drive and driven shafts while the rotating drive blade design develops such a high torque on the casing as to make mounting both structurally and economically unfeasible. Further, both designs have such low torque transfer efficiency as to be substantially useless when a propeller is attached to the drive shaft and working upon water to drive an associated boat.

In view of the foregoing, it is a general object of our invention to provide a transmission which overcomes the previously mentioned problems.

It is another object of our invention to provide a novel fluid-mechanical transmission capable of both directly coupling a drive shaft to a driven shaft for maximum power transfer and selectively varying the torque transferred to the driven shaft to allow for variable and extremely low-speed rotation of the driven shaft.

It is a further object of our invention to provide a transmission of the foregoing type which is particularly adaptable to inboard motor speed boats and which complements and allows streamline lightweight boat construction.

It is still another object of our invention to provide a novel transmission particularly adaptable for inboard motor boats which is simple in design, inexpensive to manufacture, lightweight, compact, rugged and long lasting.

It is still a further object of our invention to provide a transmission of the foregoing type which does not develop a torque on its supporting housing.

Another object of our invention is to provide a simple, lightweight and compact transmission for inboard motor boats which is easy to install and attach to all existing motors.

A further object of our invention is to provide a novel inboard motor boat transmission comprising parts which are easily accessible for replacement and servicing.

Still another object of our invention is to provide a novel fluid mechanical transmission for inboard motor boats which is selectively reversible between forward and reverse variable speed drive.

A still further object of our invention is to provide a transmission of the foregoing type which is capable of positively locking a drive shaft to a driven shaft for maximum power transfer.

The foregoing as well as other objects and advantages of our invention may be more clearly understood by reference to the following detailed description taken with the drawings which illustrate by way of example only particular embodiments of our invention.

In the drawings:

FIGURE 1 is a schematic representation of a motor-transmission combination illustrating the position of our transmission relative to the motor and an associated speed boat propeller;

FIGURE 2 is a sectional side view of one form of transmission embodying the features of our invention;

FIGURE 3 is a fragmentary, sectional, top view along the line 3—3 in FIGURE 2 illustrating the inner structure of the transmission illustrated in FIGURE 2;

FIGURE 6 is a sectional side view of another form of transmission constructed in accordance with the features of our invention;

FIGURES 7, 8 and 9 are fragmentary, sectional, bottom views of the driven member of the transmission illustrated in FIGURE 6 in neutral, reverse and forward drive positions, respectively, portions thereof being cut away to show a shifting groove in the driven shaft together with a key enabling vanes on the driven member to be rotated as the driven member moves along the driven shaft;

FIGURE 10 is a perspective view of an alternate form of shifting groove;

FIGURE 11 is a fragmentary, sectional side view illustrating an alternate form of driven member employing a plurality of flexible tubes;

FIGURE 12 is a rear view of the driven member illustrated in FIGURE 11 with the rear portion of the driven member rotated relative to the front portion as to curve the tubes to impart reverse driving movement to the driven shaft in response to fluid passing therethrough;

FIGURE 13 is a fragmentary, partially sectioned side view of still another form of driven member for our transmission including a plurality of discs connected in series by a plurality of flexible cables, the discs including a plurality of spokes which combine to define a plurality of vanes which are in a neutral position in FIGURE 13;

FIGURE 14 is a sectional side view similar to FIGURE 13 with the driven member in a forward drive position;

FIGURE 15 is an end view of the rear support plate for the series of discs illustrated in FIGURE 13;

FIGURE 16 is a schematic representation of the manner of connection between the series of discs, flexible cable, and forward support for the discs; and FIGURE 17 is a fragmentary front view of the driven member of FIGURE 13 illustrated in a reverse drive position.

Figure 4:
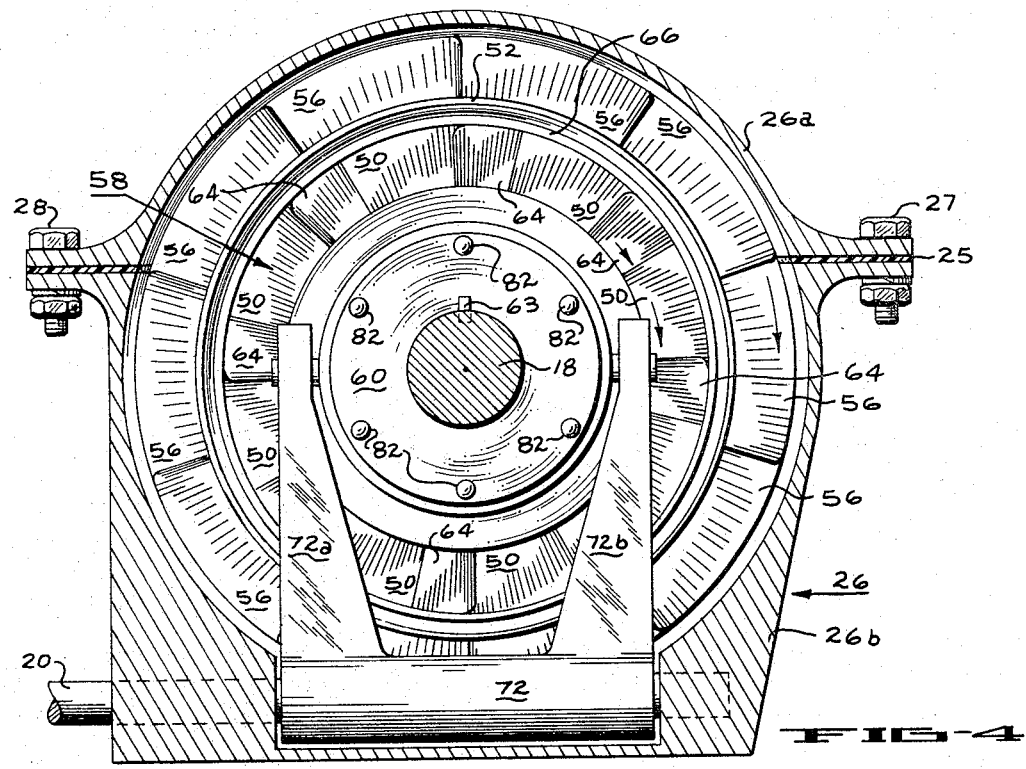
FIGURE 4 is a sectional, rear end view along the line 4—4 in FIGURE 2 showing the movable driven member of the transmission in combination with the drive member of the transmission.

In our transmission, rotation of a fluid-propelling means with a motor drive shaft pumps fluid in a rearward stream to strike a fluid-driven means connected to a driven or propeller shaft. The force of the fluid stream on the fluid-driven means produces a rotation thereof with the driven shaft, much as the wind produces rotation of a windmill. The fluid stream deflected by the fluid-driven means is then redirected and returned to the fluid-propelling means for repumping in a rearward direction. Thus, in general terms, our transmission may be termed a continuous, fluid-circulation turbine-type transmission.

Further, in our transmission, the distance between the fluid-propelling means and the fluid-driven means is selectively adjustable to vary the amount of torque transferred to the driven shaft. In this manner, the rotational velocity of the driven shaft (and a propeller connected thereto) may be selectively adjusted through a plurality of different values—being of a very low or zero value when the fluid-driven means and fluid-propelling means are far apart (or when the fluid-driven means is held stationary relative to the propelling means) and being of a value approximating the angular velocity of the drive shaft when the fluid-driven means is immediately adjacent the fluid-propelling means.

Moreover, our transmission is provided with means for positively locking the driven shaft to the drive shaft when the fluid-driven means is immediately adjacent the propelling means.

Thus, our transmission provides both a direct drive coupling, with its advantages of maximum motor power utilization and increased gasoline mileage, and a variable torque coupling, with its advantage of low speed drive for boat docking, in-harbor travel and water skier pick up without unnecessary motor wear.

All this our transmission accomplishes with a simple, lightweight, compact, yet sturdy and long-lasting design which is extremely inexpensive to manufacture and maintain. Moreover, our transmission does not develop a torque on its supporting housing and may be simply and quickly installed and mounted in any boat design in combination with any commercially available inboard boat motor. Further, because of its lightweight and compact size our transmission is ideally suited to lightweight, streamline boat constructions.

The more elaborate, yet still relatively simple, compact, and inexpensive form of our transmission possesses still another important feature. In particular, additional means are provided for varying the angle of the fluid-driven means relative to the driven shaft as the distance between the fluid-driven means and fluid-propelling means is adjusted. Thus, not only is the torque transferred to the driven shaft adjustable in magnitude, it is also adjustable in direction. This allows for variable speed drive in both a forward and a reverse direction while maintaining intact the advantages of the direct drive coupling.

In FIGURE 1, our transmission is represented by the numeral 10 and is installed between a motor 12 and a propeller 14 by connection to a motor drive shaft 16 and to a propeller or driven shaft 18, respectively. The adjustment means for the transmission 10 is illustrated as comprising a lateral rocker shaft 20 extending into the transmission housing and a linkage 22 connected to the rocker shaft and to a hand-operated gear shift handle 24 for turning the rocker shaft to control the relative displacement between the fluid-propelling and driven members of the transmission.

Figure 5:
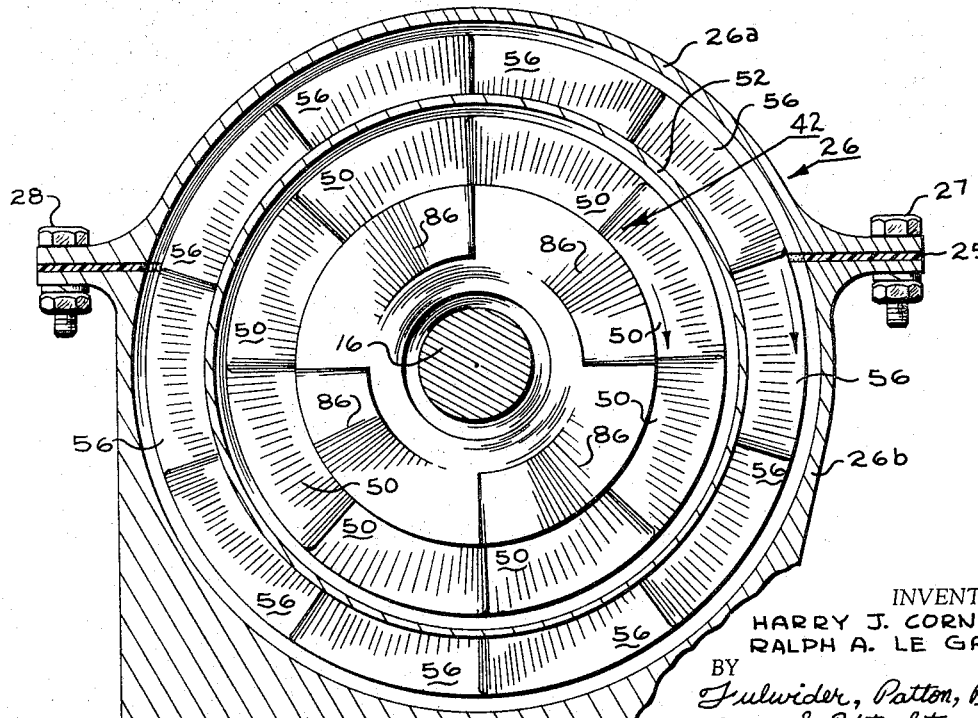
FIGURE 5 is a cross sectional view along the line 5—5 in FIGURE 2 showing the rear face of the drive member of the transmission.

One embodiment of a basic form of our invention is illustrated most clearly in FIGURES 2, 3, 4 and 5 as comprising a hollow, metal, generally cylindrical, support housing 26 defining a closed, fluid-containing chamber 28. The housing 24 is formed in two sections including an upper section 26a and a lower section 26b separated by a gasket 25. The upper and lower sections are bolted together at 27 and 28 to create a watertight seal therebetween and to allow for easy access to the inner workings of the transmission for servicing and replacement of parts.

The drive shaft 16 extends through a seal 30 seated in an opening in the front end 32 of the housing 26 and is supported for rotation about its longitudinal axis.

Likewise, the driven shaft 18 extends through a seal 34 seated in an opening in the rear end 36 of the housing 26 and is supported for rotation about its longitudinal axis in line with the drive shaft 16. In particular, the opposing inner ends of the drive and driven shafts each includes conical holes 38 for receiving a ball bearing 40. The ball bearing 40 maintains a slight separation between the inner ends of the drive and driven shafts and provides for a low friction support for the inner end of the driven shaft 18 within the housing. The ball bearing 40 also allows the drive and driven shafts to rotate freely independent of each other.

Thus positioned, the drive shaft 16 supports a fluid-propelling means 42 within the fluid chamber 28 for rotation with the drive shaft. In the form illustrated, the fluid-propelling means 42 comprises a hub 44 having a forwardly converging outer surface, a central bore 45 therethrough, and a longitudinally extending slot 46 along the bore 45. The hub 44 is mounted on the drive shaft 16 by slipping the hub over the rear end of the shaft with the slot 46 mating with a key 47 connected to and along the drive shaft to prevent relative rotation between the drive shaft and the hub. Axial movement of the hub 44 along the drive shaft 16 is prevented by a set screw 48 which extends through the hub into the drive shaft.

Extending radially outward from the hub 44 transverse to the axis of the drive shaft are a plurality of spaced, slightly curved, fluid-propelling blades 50. The blades 50 are adapted to propel fluid rearward with rotation of the drive shaft 16.

Surrounding and connected to the ends of the blades 50 is an annular shroud 52 for directing fluid propelled by the blades 50 in a rearward stream toward the rear end 36 of the housing 26. As illustrated, the shroud extends rearward beyond the blades 50 and has an inwardly inclined inner surface at its rear end portion 54.

Connected to and extending outward from the outer surface of the shroud 52 are a plurality of fluid-returning vanes 56. The vanes 56 are spaced from each other and are slightly curved transverse to the drive shaft 16 to propel fluid in the stream forward toward the front end 32 of the housing. The fluid-return vanes 56 thus function to insure a continuous and complete circulation of fluid around and through the annular shroud 52 for propulsion in a stream rearward by the fluid-propelling blades 50.

Mounted on the driven shaft 18 for rotation therewith as well as movement therealong is a fluid-driven means 58. In the illustrated form, the fluid-driven means 58 comprises a hub 60 having a central bore 61 therethrough with a longitudinally extending slot 62 therein. The hub 60 is mounted on the driven shaft 18 by slipping the hub over the front end of the driven shaft with the slot 62 mating with a key 63 fixedly connected to and along the driven shaft. The hub 60 thus turns with the driven shaft but is free to slide along the key 63 toward and away from the fluid-propelling means 42.

Similar to the fluid-propelling means 42, the fluid-driven means 58 further includes a plurality of fluid-driven vanes 64 extending radially from the hub 60 transverse to the axis of the driven shaft 18. The vanes 64 are slightly curved and adapted to receive the rearward fluid stream developed by rotation of the fluid-propelling blades 50. The curvature of the vanes 64 is such that the fluid stream striking the vanes 64 produces a rotary force on the vanes and the hub 60 causing a rotation of the driven shaft 18 in the same direction as the drive shaft 16. In this manner, the combination of the fluid-propelling blades 50 and fluid-driven vanes 64 functions similar to a conventional turbine wherein fluid flowing normal to the turbine produces a rotation of the turbine upon striking the turbine blades.

The flow of fluid over and through the vanes 64 is constrained by an annular shroud 66 connected to the outer ends of the vanes. Thus, in operation, fluid propelled by the blades 50 is constrained to flow in a rearward stream by the annular shroud 52 through the annular shroud 66 in contact with the fluid-driven vanes 64 and rearward toward the rear end 36 of the housing 26. There the fluid is redirected by a concave, annular recess 68 in the rear face of the housing coaxial with the driven shaft 18. In particular, fluid leaving the annular shroud 66 contacts the innermost concave surface of the annular recess 68, follows the curvature of the recess and is projected forward along the inner surface of the chamber 28 forward toward and around the outside of the annular shroud 52. Rotation of the fluid-returning vanes 56 produces a pumping of the redirected fluid forward toward the forward inner face of the housing which, similar to the rear face, includes a concave, annular recess 70 coaxial with the drive shaft 16. The fluid pumped by the fluid-returning vanes 56 contacts the outermost concave surface of the recess 70, follows the curvature of the recess and is projected inward and rearward toward and through the fluid-propelling blades 50. The fluid in travelling through the fluid-propelling blades 50 is subjected to a slight venturi action due to the taper of the hub 44 which reduces the size of the fluid path as the fluid is propelled rearward by the blades 50 through the annular shroud 52. This further increases the velocity of the fluid which is propelled in a rapidly moving stream rearward to continue the circulation and pumping action of the fluid between the front and rear of the housing 26 through and about the annular shrouds. In practice, the continuous circulation of fluid within the fluid chamber 28 produces a highly efficient turbine type of transmission of rotational power even though employing a single set of driven vanes. It is, of course, recognized if still further efficiency is desired, the number of sets of driven vanes may be increased by staggering the vanes in rows along the length of the hub 60.

As previously indicated, the fluid-driven means 58 is movable along the driven shaft 18 toward and away from the fluid-propelling means 42. In the embodiment illustrated, the selective control over the movement of the fluid-driven means 58 is provided by the combination of the lateral rocker shaft 20 (and its associated linkage members external to the transmission), a yoke 72 and a shifting ring 74. The rocker shaft 20 extends through a side of the housing 26, the lower portion of the fluid chamber 28 and into an opposite side of the housing and is thus supported for rotation about its longitudinal axis. The yoke 72 is connected to and supported by the rocker shaft 20 and extends generally vertically therefrom with arms 72a and 72b on opposite sides of the fluid-driven means 58. The upper ends of the arms 72a and 72b each include a generally vertical slot 76 for receiving a lateral pin or lug 78 extending from the shifting ring 74. The shifting ring 74, meanwhile, rides freely within an annular slot 80 in the rear portion of the hub 60 (the hub 60 being freely turnable relative to the shifting ring 74). By this arrangement, rotation of the rocker shaft 20 produces a corresponding rocking of the yoke 72 and either a forward or rearward sliding movement of the fluid-driven means 58 along the key 63 depending upon the direction of rotation of the rocker shaft.

In FIGURE 2, the forward position of the fluid-driven means 58 is represented by the phantom outline 58' while the rearward position for the fluid-driven means along the driven shaft is represented by the phantom outline 58" (corresponding positions of the yoke 72 being represented by the phantom outlines 72' and 72"). Two important features are indicated by the phantom outlines 58' and 58". Firstly, in the rearward position, the fluid-driven means 58 is locked to the housing 26 to prevent rotation thereof as well as rotation of the driven shaft, independent of rotation of the fluid-propelling means 42. This defines a locked-neutral position for the transmission and in the illustrated embodiment is accomplished by the insertion of a plurality of lugs 82 extending from the rear face of the hub 60 into mating recesses 83 in the rear end of the housing 26.

Secondly, in the forward position, the fluid-driven means 58 positively locks with the fluid-propelling means to directly couple the driven shaft 18 to the drive shaft 16 for rotation therewith. This is accomplished by the inclusion of mating lugs 84 and 86 on the forward surface of the hub 60 and the rear surface of the hub 44, respectively.

With regard to the positive locking of the fluid-driven means 58 to the fluid-propelling means 42, it should be noted that the vanes 64 and annular shroud 66 are dimensioned to fit into and rotate within the rearward extension of the annular shroud 52 beyond the fluid-propelling blades 50.

Further, as the fluid-driven means 58 is moved along the driven shaft 18 toward the fluid-propelling means 42, a fluid stream of increasing velocity strikes the vanes 64. Thus, the rotational force exerted on the vanes 64 increases as the fluid-driven means 58 moves closer to the fluid-propelling means 42 within the annular shroud 52. In this manner, the torque transferred from the drive shaft 16 to the driven shaft 18 likewise increases to increase the rotational velocity of the driven shaft—being of a very low value when the fluid-driven means 58 is separated from the fluid-propelling means 42 and increasing in value with movement of the fluid-driven means toward the fluid-propelling means. In particular, when the fluid-driven means 58 is immediately adjacent the fluid-propelling means 42, the angular velocity of the driven shaft 18 approximates that of the fluid propelling means. Further forward movement of the fluid-driven means 58 then locks the fluid-driven means to the fluid-propelling means 42 with a minimum of shock occurring between the lugs 84 and 86.

As prevoiusly indicated, with a direct drive coupling between the drive shaft 16 and the drive shaft 18, maximum motor power may be utilized to drive an associated boat and to achieve maximum gasoline mileage.

When it is desired to travel at a lower speed as when docking, travelling within a harbor, or picking up a water skier, the positive lock between the fluid-driven means 58 and the fluid-propelling means 42 is simply released by moving the fluid-driven means 58 rearward along the key 63 away from the fluid-propelling means. Due to the turbine design of the fluid-driven means 58, the release of the positive lock is almost instantaneous and automatic since fluid propelled by the fluid-propelling blades 50 and striking the vanes 64 naturally tends to move the fluid-driven means rearward away from the fluid-propelling means.

As the fluid-driven means 58 is moved away from the fluid-propelling means 42, the torque transferred to the driven shaft 18 decreases with a corresponding decrease in the angular velocity of the driven shaft relative to the drive shaft 16. In order to utilize a very compact construction for our transmission, however, it is desirable to provide for an even more rapid reduction in the angular velocity of the driven shaft 18 with rearward movement of the fluid-driven means 58. Therefore, we have found it desirable in our basic transmission design to include means for relieving fluid pressure within the annular shroud 52 adjacent the fluid-propelling means 42 as the fluid-driven means 58 is moved rearward away from the fluid-propelling means.

This may be accomplished in many different ways. In the form illustrated, however, the pressure relief is provided by means for allowing fluid to escape from the annular shroud 52 by-passing the annular shroud 66 surrounding the vanes 64. Again, numerous means may be employed to implement this design. For example, a plurality of spaced, inwardly inclined slots can be included in the inner surface of the annular shroud 52 at its rear end or a plurality of holes of varying dimension and spacing can be included in the annular shroud also at its rear section. In the illustrated embodiment, however, the fluid pressure relief is provided by the inward incline 54 of the annular shroud 52 at its rear section. This provides an increasing gap between the inside of the annular shroud 52 and the outside of the annular shroud 66 as the fluid-driven means 58 moves away from the fluid-propelling means 42 thereby allowing increasing quantities of fluid to escape from the annular shroud 52 with a corresponding drop in fluid pressure. As the fluid pressure drops, the velocity of the rearward fluid stream decreases to produce a rapid reduction in the torque transferred to the driven shaft 18. Thus, only a very short rearward movement of the fluid-driven means 58 from the fluid-propelling means 42 is required to produce a maximum change in the angular velocity of the driven shaft 18.

From the foregoing, it should be appreciated that our transmission, even in a basic form, provides both a direct drive coupling, with its advantages of maximum motor power utilization and increased gasoline mileage, and a variable torque coupling, with its advantages of low speed drive for boat docking in-harbor travel and water skier pick up without unnecessary motor wear. All this our transmission accomplishes with a simple, lightweight, compact, inexpensive design. Moreover, since fluid movement within the housing is almost entirely in longitudinal directions along the drive and driven shafts, little, if any, torque is developed upon the housing itself. This allows our transmission to be installed using a lightweight, inexpensive mounting. Further, because of its lightweight and compact size, our transmission is ideally suited to lightweight, streamlined boat constructions.

As previously indicated, the more elaborate forms of our transmission possess still another important feature, namely, that the angle of the fluid-driven means relative to the driven shaft is variable as the distance between the fluid-driven means and fluid-propelling means is adjusted. This means that the torque transferred to the driven shaft is adjustable both in magnitude and in direction and allows for variable speed drive in both a forward and a reverse direction while maintaining intact the advantages of a direct-drive coupling.

One form of our reversible drive transmission design is illustrated in FIGURES 6, 7, 8 and 9. The overall design of the reversible transmission is quite similar to that previously described. Therefore, we utilize the same reference numerals in FIGURES 6, 7, 8 and 9 as those previously employed in FIGURES 2–5 to indicate similar parts and limit our description here to the differences in structure and operation of the reversible transmission.

In the form illustrated in FIGURES 6 through 9, the annular shroud 52 surrounding the blades 50 extends further to the rear than in the embodiment previously described, and, at all times surrounds a major portion of the fluid-driven means 58.

In addition to annular shroud 52, the construction of the fluid-driven means 58 is modified to allow for angular movement of the fluid-driven means relative to the driven shaft 18 with longitudinal movement along a driven shaft. In particular, the fluid-driven means 58 includes a plurality of adjustable vanes 90 spaced from each other around and extending generally radially from the hub 60. The vanes 90 may be composed of various materials, including without limitation, metal, plastic, rubber or a combination thereof. Further, the vanes may be of a rigid construction or may be slightly flexible.

The front end of each vane 90 is hinged to the hub 60 by a radially extending pin 92 having its radial inner end connected to the hub and its main body passing through a hole in the vane. In this manner, the front end of each vane is connected for longitudinal movement with the hub along the driven shaft toward and away from the fluid-propelling means 42.

In a similar manner, a pin 94 extends radially from the hub 60 through a hole in and along the rear end of each vane 90. The radial inner end of each pin 94, however, is connected to a ring 96 which rides freely within an annular slot 94 in the hub 60. Connected to a rear face of the ring 96 within a recess 100 is a key 102. The key 102 extends through a hole 104 in the hub 60 into a shifting groove 106 in the driven shaft 18. The shifting groove 106 is generally S-shaped and elongated along the axis of the driven shaft 18.

As the fluid-driven means 58 is moved longitudinally along the driven shaft 18, the key 102 rides within and along the shifting groove. The ring 96 follows the key 102 and rotates therewith to produce an angular movement of the rear end of each vane 90 with longitudinal movement of the hub 60 along the driven shaft. The angular movement of the rear end of each vane 90 varies the angle of the vanes relative to the driven shaft between the reverse and forward drive positions illustrated in FIGURES 8 and 9, respectively.

In particular, when the fluid-driven means 58 is in the position illustrated in FIGURE 7, the key 102 is centrally disposed along the shifting groove 106 and the vanes 90 are parallel to the axis of the driven shaft 18. This defines a neutral position for the reversible transmission in that fluid propelled by the fluid-propelling means 42 exerts little, if any, rotational forces on the vanes 90 to maintain the fluid-driven means in a stationary position relative to the fluid-propelling means. As the fluid-driven means 58 is moved longitudinally along the driven shaft 18 away from the fluid-propelling means, however, the key 102 slides rearward along the shifting groove 106 to the position illustrated in FIGURE 8. As the key moves to the rear of the shifting groove 106, the ring 96 rotates in the direction indicated by the associated arrow causing the vanes 90 to assume the angle relative to the driven shaft indicated in FIGURE 8. As the angle of the vanes 90 changes from the neutral position in FIGURE 7 to that illustrated in FIGURE 8, fluid propelled by the fluid-propelling means 42 strikes the inclined surfaces of the vanes 90 producing a rotation of the fluid-driven means and driven shaft 18 in a direction opposite to the direction of rotation of the drive shaft. Thus, movement from the neutral position to the position illustrated in FIGURE 8 produces a reverse drive of the driven shaft 18 and its associated boat propeller.

Similarly, when the fluid-driven means 58 is moved along the driven shaft in a forward direction, the key 102 slides forward along the shifting groove 106 to the position illustrated in FIGURE 9. As the key 102 moves forward along the shifting groove 106, the ring 96 rotates in the direction indicated by its associated arrow to produce a corresponding rotation of the vanes 90 relative to the driven shaft 18. Further, as the fluid-driven means 58 moves forward along the driven shaft 18, fluid propelled in a rearward stream by the fluid-propelling means 48 contacts the inclined surface of the vanes 90 to produce a rotation of the driven shaft in the same direction as the drive shaft. Thus, movement from the neutral position to the position illustrated in FIGURE 9 produces a forward drive of the driven shaft 18.

As previously described, movement of the fluid-driven means 58 toward the fluid-propelling means also increases the torque transferred to the driven shaft 18 to increase the angular velocity thereof to approximate that of the drive shaft 16 when the fluid-driven means is immediately adjacent the fluid-propelling means. Also, as illustrated in FIGURE 9, when the fluid-driven means 58 is immediately adjacent the fluid-propelling means 42 a positive lock occurs therebetween to directly couple the driven shaft to the drive shaft. This operation is as previously described and is automatically releasable upon rearward movement of the fluid-driven means away from the fluid-propelling means.

Thus, our reversible transmission maintains intact the advantages of the direct drive coupling while providing for variable speed drive in both a forward and a reverse direction with movement of the fluid-driven means 58 along the driven shaft 18.

It should be noted in passing that the shape of the shifting groove 106 may take various forms. As previously described, the shifting groove 106 may be generally S-shaped and elongated along the axis of the driven shaft 18. However, as illustrated in FIGURE 10, the shifting groove may also be of a general U-shape, opening to the rear along the driven shaft 18.

FIGURES 11 and 12 illustrate a different form of the fluid-driven means 58 for our reversible transmission. Rather than including a plurality of shiftable vanes, the illustrated embodiment includes a plurality of flexible tubes 108.

The tubes 108 are spaced from each other and extend in planes generally parallel to the driven shaft 18. A forward end of each tube 108 is supported and fixed within an opening 110 in the forward face of the hub 60 while the rear end of each tube is supported and fixed within a hole 112 in the ring 96.

The connection of the ring 96 about the hub 60 is as previously described with the key 102 extending into the shifting groove 106. Thus, the operation of the fluid-driven means 58 illustrated in FIGURES 11 and 12 is substantially the same as previously described in connection with FIGURES 6 through 9 in that when the key 102 is centrally disposed along the shifting groove 106, the tubes 108 are substantially straight, as illustrated in FIGURE 11, to define a neutral position for the transmission. When the fluid-driven means 58 is moved rearward from the neutral position along the driven shaft 18, the ring 96 is rotated to produce the curvature of the tubes illustrated in FIGURE 12. In this position, fluid passing through the tubes 108 exerts a rotational force on the fluid-driven means 58 to rotate the driven shaft 18 in a reverse direction relative to the drive shaft 16. Similarly, when the fluid-driven means 58 is moved forward from the neutral position toward the fluid-propelling means 42, the tubes 108 are curved such that fluid passing therethrough produces a like rotation of the driven shaft.

FIGURES 11 and 12 illustrate an additional modification in our reversible transmission. In particular, an annular shroud 116 is connected by a plurality of arms 118 to the inside of the housing 26. The shroud 116 surrounds the fluid-driven means 58 when outside the shroud 52. This maintains a shroud covering around the fluid-driven mean 58 to constrict fluid flow through the tubes 108 while allowing the shrould 52 surrounding the fluid-propelling means 42 to be of the shorter, more sturdy design illustrated in FIGURES 2 through 5.

Another embodiment of the fluid-driven means 58 for our reversible transmission is illustrated in FIGURES 13 through 17. The mechanism for sliding the fluid-driven means 58 along the driven shaft 18 is the same as previously described in connection with FIGURES 6 through 9. For clarity, however, the rear end of the hub 60 as well as the yoke 72 and shifting ring 74 are not shown. Also, the arrangement of the fluid-driven means 58 within an annular shroud connected to the housing of the transmission is the same as previously described in connection with FIGURES 11 and 12.

The construction of the movable portions of the fluid-driven means 58, however, is substantially different and comprises a series of metal discs 120 having central openings for mounting over the hub 60 normal to the driven shaft 18. The discs 120 have the general shape illustrated in FIGURE 15, each including a plurality of radial spokes 122 connected at their outer ends by an annular ring 124. The discs 120 are arranged such that corresponding spokes 122 are aligned with each other to form a plurality of vanes along the driven shaft 18. In a similar manner, the annular rings 124 combine to form an annular shroud about the vanes.

The discs 120 are connected together and to the hub 60 by a plurality of flexible cables 126 passing through holes in the ends of the spokes 122. A forward end of each cable is connected to the front of the hub 60 which is modified in this embodiment to have a shape similar to the discs 120. The connection to the front face of the hub 60 is illustrated most clearly in FIGURE 16 with the cable 126 passing through and secured within an opening in the disc-shaped front face of the hub. The rear end of each cable 126 is knotted to prevent the discs from slipping off the cable.

The rear disc 120a of the series of discs 120 is slightly thicker than the other discs and provides means for mounting the key 102 for extension into the shifting groove 106 in the driven shaft 18. In this manner, the connection of the disc 120a is substantially the same as the ring 96 previously described in connection with FIGURES 6 through 9.

Accordingly, in operation, movement of the fluid-driven means 58 along the driven shaft 18 toward the fluid-propelling means 42 produces a rotation of the disc 120a with a corresponding angular movement of the cables 126. As the cables 126 move, they cause the series of discs 120 to also rotate about the hub 60 to the position illustrated in FIGURE 14. As the discs 120 rotate about the hub, the vanes formed by the spokes thereof effectively shift in angle relative to the driven shaft 18 the same as the vanes 90 of the embodiment illustrated in FIGURES 6 through 9. Fluid propelled rearward by the fluid-propelling means 42 in striking the spokes of the discs 120 thus produces a rotation of the driven shaft in the same direction as the drive shaft. Further, as illustrated in FIGURE 14, when the fluid-driven means 58 is in its forward position, the lugs 86 positively lock with the lugs 84 of the fluid-propelling means to provide a direct coupling between the driven shaft 18 and the drive shaft 16.

Likewise, movement of the fluid-driven means 58 away from the fluid-propelling means 42 causes the disc 120a to rotate in an opposite direction and the spokes of the discs 120 to assume the position illustrated in FIGURE 17. In this position, fluid striking the vanes formed by the plurality of spokes 122 produces a rotation of the driven shaft 18 in a direction opposite to the drive shaft 16 to define a reverse drive position for the transmission.

Thus, in the embodiment illustrated in FIGURES 13 through 17, the torque transferred to the driven shaft 18 is adjustable in magnitude as well as in direction. Further, variable speed drive is provided both in a forward and a reverse direction while maintaining intact the advantages of the direct drive coupling between the drive and driven shafts.

In view of the foregoing, it should be appreciated that the transmission of our invention solves the presently existing problems of high power inboard motor boats by providing for maximum motor power utilization, increased gasoline mileage and variable low speed drive all in a simple, inexpensive, lightweight and compact package.

In the foregoing, specific embodiments of our transmissions have been described in detail. Of course, changes and modifications may occur to those skilled in the art without departing from the spirit of our invention. Therefore, we intend that our invention be limited in scope only by the following claims.

We claim:
1. A transmission comprising:
   a hollow housing defining a fluid chamber;
   a drive shaft extending through a forward end of said housing into said chamber, said drive shaft being adapted for rotation about its longitudinal axis;
   a driven shaft extending through a rear end of said housing into said chamber, said driven shaft being adapted for rotation about said longitudinal axis;
   pump means mounted on said drive shaft for pumping fluid in response to rotation of said drive shaft in a pressurized and substantially axial stream with respect to said drive shaft;
   fluid driven means mounted on said driven shaft for producing a rotation of said driven shaft in response to said axial stream of fluid from said pump means striking said driven means, at least one of said pump means and fluid driven means being movable toward and away from the other thereof along the axis of said drive and driven shafts;
   an annular shroud within said chamber at spacing from the walls thereof and dispersed around said pump means, said shroud extending rearwardly at least partially over said fluid driven means; and
   selectively operable means for so moving said one of said pump means and fluid driven means to vary the distance between said pump means and said fluid driven means along said axis, thereby varying the degree of response of said driven means to said axial stream of fluid.

2. A transmission as defined in claim 1, including means in said chcamber at the forward and rear ends thereof for directing fluid striking said fluid driven means forwardly between said housing and said shroud to said pump means, thereby producing a continuous closed circulation of fluid between said forward and rear ends of said chamber.

3. A transmission as defined in claim 2, wherein said pump means includes a hub connected to said drive shaft, said hub having a rearwardly diverging outer surface forming an annular area between said hub and said shroud which has a rearwardly decreasing cross-section; and
   a plurality of fluid propelling blades extending radially outwardly from said hub.

4. A transmission as defined in claim 1, including cooperative means connected to said drive and driven shafts which cooperate for positively locking said driven shaft to said drive shaft when said fluid driven means is brought immediately adjacent said pump means by selectively operable means.

5. A transmission comprising:
   a hollow housing defining a fluid chamber;
   a drive shaft extending through a forward end of said housing into said chamber, said drive shaft being adapted for rotation about its longitudinal axis;
   a driven shaft extending through a rear end of said housing into said chamber substantially in line with said drive shaft, said driven shaft being adapted for rotation about its longitudinal axis;
   an annular shroud secured to said housing concentrically disposed with respect to said drive and driven shafts within said chamber at spacing from the walls thereof;
   a hub connected to said drive shaft having a rearwardly diverging outer surface, there being a space which has a rearwardly decreasing cross-section defined by said outer surface and said annular shroud;
   a plurality of fluid propelling blades extending from said hub for propelling fluid under pressure in response to rotation of said drive shaft in a rearward and substantially axial stream with respect to said drive and driven shafts;
   fluid driven means mounted on said driven shaft for producing a rotation of said driven shaft in response to said axial stream of fluid striking said driven means;
   adjusting means for moving said fluid driven means longitudinally along said driven shaft for varying the distance between said hub and said fluid driven means; and
   means on said housing disposed within said chamber cooperable with said annular shroud to form a recirculating flow path for said stream after striking said fluid driven means.

6. A transmission as defined in claim 5, including locking means connected to said drive and driven shafts for cooperating to positively lock said driven shaft to said drive shaft when said fluid driven means is brought immediately adjacent said hub by said adjusting means.

7. A transmission as defined in claim 6, wherein said locking means includes:
   a plurality of locking lugs disposed on one of the rearward end of said hub and the forward end of said fluid driven means; and
   a plurality of mating recesses on the other of the rearward end of said hub and the forward end of said fluid driven means, there being a generally annular space between said lugs and recesses, which is in constant communication with said space defined by said outer surface of said hub and shroud.

8. A transmission as defined in claim 6, wherein said fluid driven means includes a plurality of fluid driven vanes; and wherein said adjusting means includes means for simultaneously varying the angles of said fluid driven vanes relative to said driven shaft with the longitudinal movement of said fluid driven vanes.

9. A transmission as defined in claim 5, wherein said fluid driven means includes a plurality of fluid driven vanes;

said adjusting means includes a first means connecting a first end of each of said fluid driven vanes to said driven shaft for generally longitudinal movement along said shaft; and a second means connecting a second end of each of said fluid driven vanes to said driven shaft for angular movement relative to said driven shaft with longitudinal movement of said first end, whereby movement of said fluid driven vanes along said driven shaft varies the distance between said hub and said fluid driven vanes and the angle of said fluid driven vanes relative to said driven shaft for reversing the direction of rotation of said driven shaft.

10. A transmission as defined in claim 5, wherein said fluid driven means includes:

a mounting hub on said driven shaft and rotatable therewith and movable longitudinally therealong;

a series of annular discs arranged normal to said driven shaft and mounted on said mounting hub in side-by-side relation, each of said discs having a plurality of apertures separated by radially extending spokes, with corresponding spokes and apertures on adjacent discs angularly aligned so as to form a plurality of continuous flow paths through said fluid driven means for receiving said axial stream of fluid, said discs being arranged for angular, incremental shifting relative to one another to vary the alignment of said apertures;

cable means connecting corresponding ones of said spokes;

means securing an end one of said series of discs to said hub; and means secured to said cable means and to the opposite end one of said series of discs responsive to such movement of said mounting hubs longitudinally of said driven shaft for angularly shifting said opposite end one of said series of discs and thereby producing angular, incremental shifting of said discs.

11. A transmission as defined in claim 10, including locking means connected to said drive and driven shafts for cooperating to positively lock said drive and driven shafts when said mounting hub is brought immediately adjacent said hub by said adjusting means.

12. A transmission comprising:

a hollow housing defining a fluid chamber;

a drive shaft extending through a forward end of said housing into said chamber, said drive shaft being adapted for rotation about its longitudinal axis;

a driven shaft extending through a rear end of said housing into said chamber, said driven shaft being adapted for rotation about its longitudinal axis;

pump means mounted on said drive shaft for pumping fluid in response to rotation of said drive shaft in a substantially axial stream with respect to said drive shaft; and fluid driven means including a series of discs normal to and mounted on said driven shaft in side-by-side relation for rotation therewith, each of said discs having an aperture therein angularly aligned with the aperture on the adjacent discs so as to form a continuous flow path through said discs for receiving said axial stream of fluid from said pump means, said discs being mounted on said driven shaft for angular, incremental shifting relative to one another to vary the alignment of said apertures, whereby the edges of said apertures cooperate to provide said driven means with an angularly shiftable vane.

13. A transmission as defined in claim 12, wherein each of said discs is formed with a plurality of apertures, with corresponding apertures on adjacent discs being so aligned.

14. A transmission as defined in claim 13, including shifting means operatively associated with said discs for maintaining them with corresponding apertures so aligned and for effecting such angular, incremental shifting.

15. A transmission as defined in claim 12, wherein said aperture in each of said discs is entirely surrounded by portions of that disc.

16. A transmission as defined in claim 5, wherein said fluid driven means includes:

a plurality of flexible tubes; and support means supporting said tubes in different planes substantially parallel to said driven shaft for both rotation therewith and movement therealong, said tubes being adapted to produce a rotation of said driven shaft in response to fluid in said axial stream passing therethrough, said support means including means connecting a first end of said tubes to said driven shaft for generally longitudinal movement along said driven shaft and means connecting a second end of said tubes to said driven shaft for angular movement relative to said driven shaft with longitudinal movement of said first end, whereby movement of said tubes along said driven shaft varies the distance between said hub and said tubes and the angle of said tubes relative to said driven shaft for reversing the direction of rotation of said driven shaft.

17. A transmission as defined in claim 16, including locking means connected to said drive and driven shafts for cooperating to positively lock said drive and driven shafts when said driven means is brought immediately adjacent said hub by said adjusting means.

18. A transmission comprising:

a hollow housing defining a fluid chamber;

a drive shaft extending through a forward end of said housing into said chamber, said drive shaft being adapted for rotation about its longitudinal axis;

a driven shaft extending through a rear end of said housing into said chamber, said driven shaft being adapted for rotation about its longitudinal axis;

pump means mounted on said drive shaft for pumping fluid in response to rotation of said drive shaft in a pressurized and substantially axial stream with respect to said drive shaft;

fluid driven means including a series of discs arranged normal to and mounted on said driven shaft in side-by-side relation for rotation therewith, each of said discs having a plurality of apertures at substantially equi-angularly spaced intervals adjacent its periphery, with corresponding apertures on adjacent discs angularly aligned so as to form a plurality of continuous flow paths through said discs for receiving the axial stream of fluid from said pump means, said discs being mounted on said driven shaft for angular, incremental shifting relative to one another to vary the alignment of said apertures, whereby the edges of said apertures cooperate to provide said driven means with a plurality of angularly shiftable vanes;

an annular shroud within said chamber at spacing from the wall thereof and dispersed around said pump means, said shroud extending rearwardly at least partially over said fluid driven means;

adjusting means for moving said fluid driven means longitudinally along said driven shaft for varying the distance between said pump means and said fluid driven means; and shifting means operatively associated with said discs for maintaining them with corresponding apertures so aligned and for effecting such angular, incremental shifting.

19. A fluid driven device comprising:

a hub rotatable about an axis;

a series of discs arranged normal to said axis and mounted on said hub in side-by-side relation for rotation therewith, each of said discs having a plurality of apertures at substantially equi-angularly spaced intervals adjacent its periphery, with corresponding apertures on adjacent discs angularly aligned so as to form a plurality of continuous flow paths through said discs, said discs being mounted on said hub for angular, incremental shifting thereon relative to one another to vary the alignment of said apertures, whereby the edges of said apertures cooperate to provide said device with a plurality of angularly shiftable vanes; and shifting means interconnecting said discs and selectively operable for effecting such angular, incremental shifting thereof.

References Cited
UNITED STATES PATENTS

| | | | |
|---|---|---|---|
| 702,461 | 6/1902 | Nadrowski. | |
| 1,993,741 | 3/1935 | Jandasek | 192—3.22 |
| 2,024,698 | 12/1935 | McDougall | 60—54 X |
| 2,418,829 | 5/1947 | Gibbs. | |
| 2,618,367 | 11/1952 | Cook | 60—54 X |
| 2,627,954 | 2/1953 | Lewis | 192—3.2 |
| 2,731,119 | 1/1956 | Burdett et al. | 192—3.2 |
| 2,902,938 | 9/1959 | Ebert | 60—54 X |

BENJAMIN W. WYCHE III, *Primary Examiner.*